Jan. 24, 1956    S. L. PHILLIPS    2,731,933
WELDING RING
Filed April 30, 1952    3 Sheets-Sheet 1
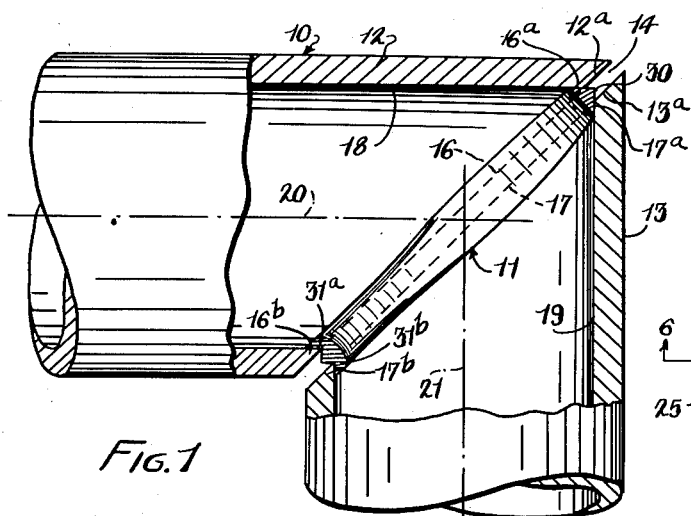
Fig. 1
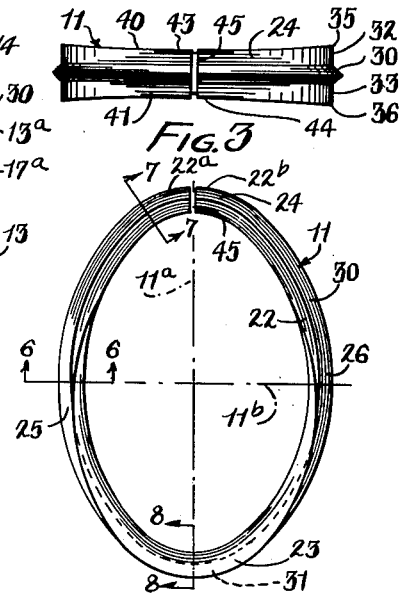
Fig. 3
Fig. 2
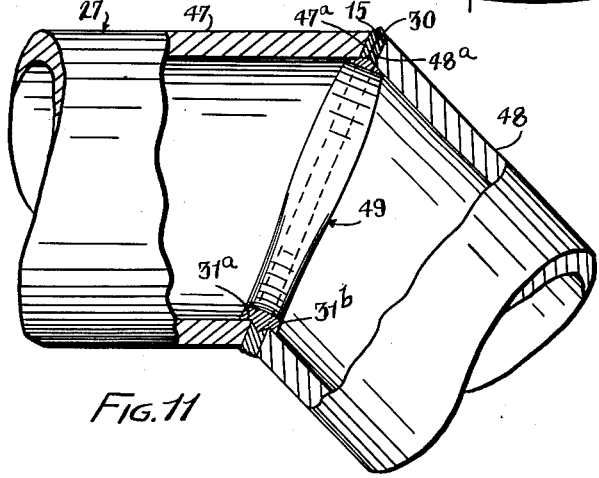
Fig. 11
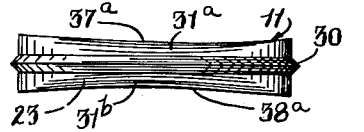
Fig. 4
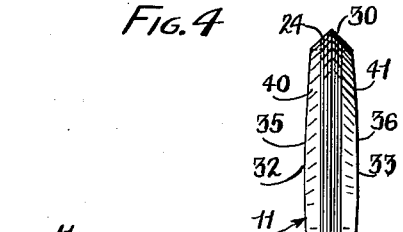
Fig. 5
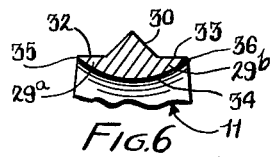
Fig. 6    Fig. 7
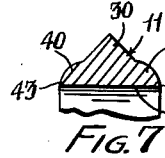
Fig. 8
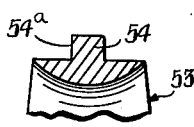
Fig. 13
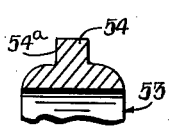
Fig. 14
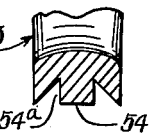
Fig. 15
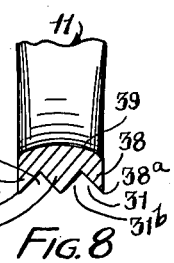
Fig. 16
INVENTOR.
STANLEY L. PHILLIPS
BY Hudson, Coughton,
Williams, David & Hoffmann
ATTORNEYS Jan. 24, 1956  S. L. PHILLIPS  2,731,933
WELDING RING
Filed April 30, 1952  3 Sheets-Sheet 2

INVENTOR.
STANLEY L. PHILLIPS
BY Hudson, Boughton,
Williams, David & Hoffmann
ATTORNEYS

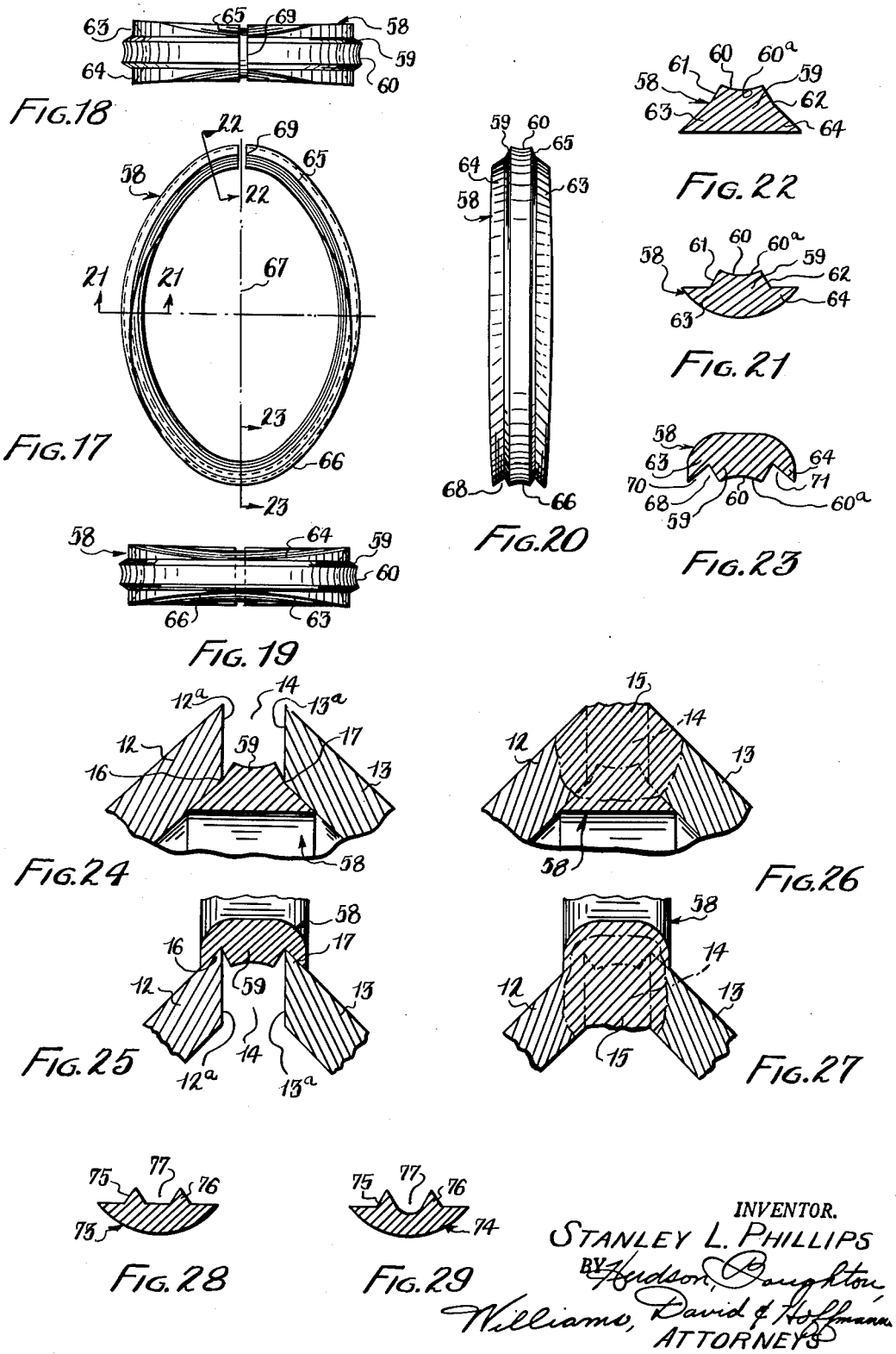

United States Patent Office 2,731,933
Patented Jan. 24, 1956

2,731,933
WELDING RING

Stanley L. Phillips, Cleveland, Ohio, assignor to Wedge Protectors, Inc., Cleveland, Ohio, a corporation of Ohio Application April 30, 1952, Serial No. 285,100

5 Claims. (Cl. 113—111)

This invention relates to welding rings of the kind frequently referred to as "chill rings" and which are used in making welded joints between a pair of hollow members or pipe ends to be connected.

Although this invention can be employed in welded joints embodying various hollow members, for convenience of description and without any intention of limiting the scope of the invention, the welded joint is hereinafter referred to merely as a pipe joint and the hollow members thereof are referred to merely as pipe ends. This novel form of welding ring results in a pipe joint which is extremely strong and rigid and is therefore especially useful for forming joints between pipes or conduit members which carry fluids under high pressures, such as the pipes or conduit members of refrigerating apparatus.

An object of the present invention is to provide a novel form of welding ring of this type for use in making a joint between a pair of pipe ends or the like extending in an angular relation to each other.

Another object is to provide a novel welding ring for the purpose indicated and which has an oblong or substantially elliptical perimetrical shape.

A further object is to provide a novel joint construction in which an oblong or substantially elliptical welding ring is engaged by a pair of oblique or truncated pipe ends or the like and cooperates therewith in forming a space for weld material such that molten metal will be prevented from dripping into the conduit passage to form icicles or other obstructions therein.

Still another object is to provide a novel welding ring of an oblong or substantially elliptical shape and having projecting external ridge means extending longitudinally along the outer periphery thereof to be engaged by the pipe ends.

As another object, this invention provides a novel welding ring comprising an oblong strip annulus having rounded ends and in which external longitudinal ridge means on the outer periphery extends around one of the rounded ends and external longitudinal groove means in said outer periphery extends around the other of the rounded ends.

It is, likewise, an object of this invention to provide a novel pipe joint or the like in which a pair of oblique pipe ends cooperate with an oblong welding ring of the kind just above referred to, in defining a space for weld material and in which certain portions of the pipe ends engage the ring on opposite sides of the ridge means thereof and other portions of the pipe ends engage in the groove means.

Additionally, this invention provides a novel welding ring and pipe joint in which the shape of the ring transversely thereof, is such as to define lateral edge portions which taper to relatively thin sharp edges adapted to hug the internal surfaces of the pipe members for the elimination of crevices in which sediment might lodge and to permit a smooth, quiet flow of fluid through the joint.

Other objects and advantages of the invention will be apparent in the following detailed description and in the accompanying sheets of drawings in which:

Fig. 1 is an elevation of a pipe joint embodying the present invention and the novel welding ring thereof, the joint being shown partially in longitudinal section and just prior to the introduction of the weld material into the weld space;

Fig. 2 is a plan view of the novel welding ring showing the same in detached relation;

Fig. 3 is an end view of the welding ring as seen from the ridged end thereof;

Fig. 4 is an end view of the welding ring as seen from the grooved end thereof;

Fig. 5 is a side elevation of the welding ring;

Figure 12:
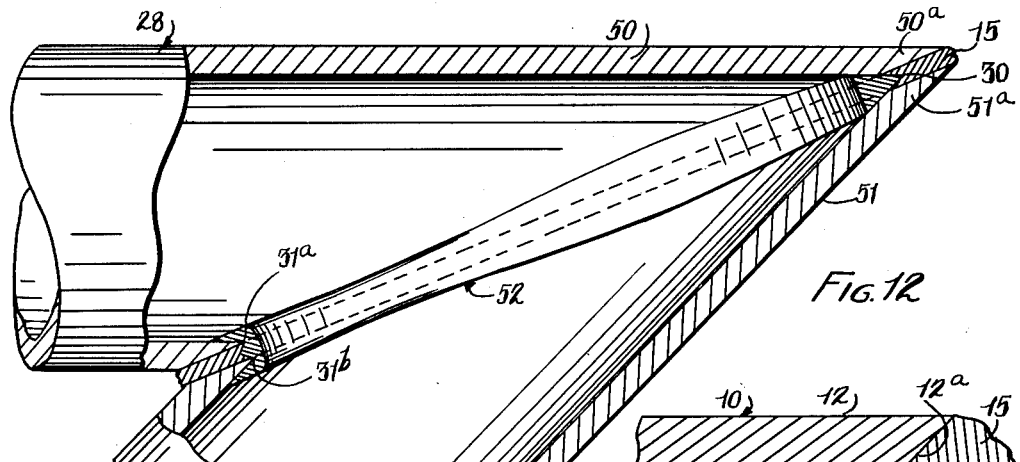
Figure 10:
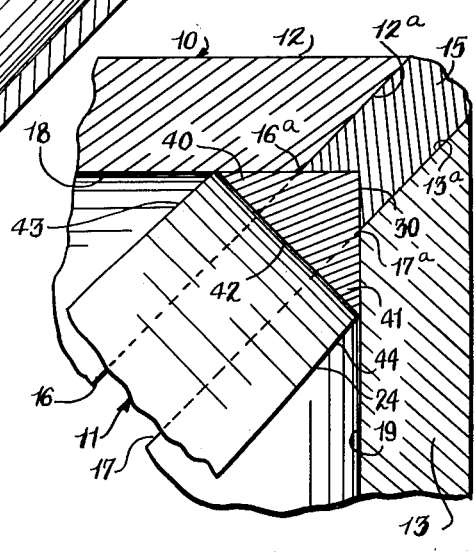
Figure 9:
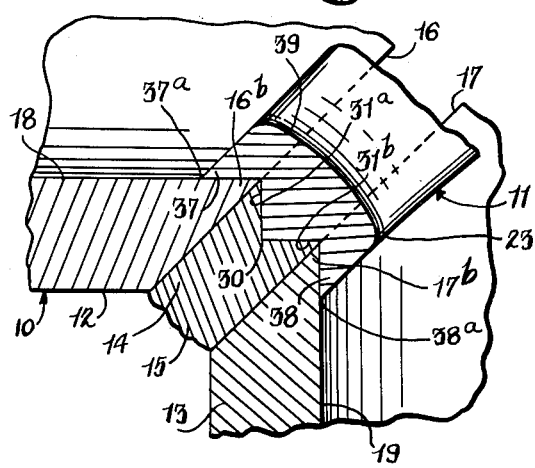

Figs. 6, 7 and 8 are transverse sections taken through the welding ring at the respective locations indicated by the section lines 6—6, 7—7 and 8—8 of Fig. 2;

Figs. 9 and 10 are fragmentary longitudinal sections taken through the novel pipe joint and corresponding with portions of Fig. 1, but showing the same on a larger scale and with the weld material in the weld space;

Fig. 11 is a partial longitudinal section taken through a pipe joint employing the novel welding ring, but showing the pipe ends disposed in an angular relation in which the included angle is greater than a right angle;

Fig. 12 is a partial longitudinal section taken through a pipe joint employing the novel welding ring, but showing the pipe ends disposed in an angular relation in which the included angle is smaller than a right angle;

Figs. 13, 14 and 15 are transverse sections similar to those of Figs. 6, 7 and 8, but taken through a modified form of oblong welding ring;

Fig. 16 is a transverse section similar to Fig. 8, but showing another modified form of oblong welding ring;

Fig. 17 is a plan view of an oblong welding ring similar to that of Fig. 2, but having a somewhat different cross-sectional shape;

Fig. 18 is an end view of the modified welding ring of Fig. 17 as seen from the ridged end;

Fig. 19 is an end view thereof as seen from the grooved end;

Fig. 20 is a side elevation of the modified welding ring of Fig. 17;

Figs. 21, 22 and 23 are sectional views taken on section lines 21—21, 22—22 and 23—23 respectively of Fig. 17;

Figs. 24 and 25 are fragmentary sectional views similar to Figs. 9 and 10, but showing the modified welding ring of Fig. 17 being used in the pipe joint, the welding ring and pipe ends being shown in position ready for the formation of the connecting weld;

Figs. 26 and 27 are the same fragmentary sectional views as in Figs. 24 and 25, but show the pipe joint after the formation of the weld; and Figs. 28 and 29 are sectional views corresponding with Fig. 22 and representing still other modified forms of oblong welding rings.

In proceeding with the detailed description, reference will be made first to Figs. 1 to 10 inclusive which show the novel pipe joint 10 and the welding ring 11 employed therein. The pipe joint 10 comprises the welding ring 11 and a pair of hollow metal members connected thereby, such as a pair of pipe ends, pipe fittings or other tubular members, and which are here represented merely as a pair of pipe ends 12 and 13. The welding ring 11 is disposed between the pipe ends 12 and 13 and cooperates therewith in defining an annular weld space 14. Fused weld material 15, suitably introduced into the weld space 14 as by an arc welding operation, connects the pipe ends 12 and 13 with each other and with the welding ring 11.

At their extreme ends, the pipe ends 12 and 13 have a truncated or oblique shape which provides thereon the elliptical flat end faces 12ª and 13ª. These flat end faces 12ª and 13ª can be formed on the pipe ends 12 and 13 by subjecting the pipe ends to a suitable shaping or cutting operation such as a sawing or grinding operation or a combination of such operations. In forming these flat end faces 12ª and 13ª, there will also be formed on the pipe ends the internal annular corners 16 and 17. The internal annular corner 16 of the pipe end 12 is defined by the included angle formed between the flat elliptical end face 12ª and the cylindrical inner surface 18. Similarly, the internal annular corner 17 of the pipe end 13 is defined by the included angle formed between the flat elliptical end face 13ª and the cylindrical inner surface 19.

At the extreme convex outer portion of the joint 10 corresponding with the portion thereof shown in Fig. 10, the internal corners 16ª and 17ª of the pipe ends 12 and 13 are defined by an obtuse angle, that is to say, these corners have an angular cross-sectional shape which is of greater extent than a right angle. At the extreme inner or concave portion of the joint 10 corresponding with the portion thereof shown in Fig. 9, the internal corners 16ᵇ and 17ᵇ of the pipe ends 12 and 13 are defined by an acute angle, that is to say, have an angular cross-sectional shape which is of smaller extent than a right angle. At diametrically opposite intermediate points of the pipe ends 12 and 13 which lie substantially on transverse planes extending through the central axes 20 and 21 of the pipe ends, the internal corners 16 and 17 have an angular cross-sectional shape which is substantially a right angle. The cross-sectional shape of the internal annular corner portions 16 and 17 of the pipe ends 12 and 13 is of importance in the pipe joint 10 because of the manner in which these corners cooperate with the welding ring 11, as will be further explained hereinafter.

The welding ring 11 is of an elliptical or oblong plan shape, as shown in Fig. 2, and comprises an annulus having rounded segments 23 and 24 at opposite ends of its major axis 11ª. The segments 23 and 24 are connected with each other by the substantially parallel side portions 25 and 26 which are located at opposite ends of the minor axis 11ᵇ of the annulus. The welding ring 11 is preferably, though not necessarily, made from a metal strip 22 of an appropriate cross-sectional shape and is, therefore, at times referred to herein as a metal strip annulus.

When two truncated or oblique pipe ends meeting in angular relation to each other, such as the pipe ends 12 and 13, are provided with flat parallel end faces, namely the end faces 12ª and 13ª, those faces will be elliptical in shape if the pipe ends are cylindrical transversely thereof. The elliptical plan shape of the welding ring 11 corresponds with this elliptical shape of the oblique end faces 12ª and 13ª of the pipe ends.

When the angularity between the axes of the pipe ends is varied from the right angle relation shown in Fig. 1, the elliptical shape of the oblique end faces and of the welding ring will vary accordingly. Thus, when the angularity between the pipe ends approaches a straight angle, the major axis of the ellipse will decrease. This condition is represented by the pipe joint 27 of Fig. 11. When the angularity between the pipe ends is less than a right angle, the elliptical shape of the oblique pipe ends also varies from the shape shown in Fig. 1, and in that case, the major axis increases. This is the condition represented by the pipe joint 28 of Fig. 12.

The oblique shape of the pipe ends will always be an ellipse when the pipe ends are cylindrical in cross-section and for that reason the welding ring 11 has also been shown as elliptical in plan shape. It should be understood, however, that this invention is also useful in forming joints between hollow members or pipe ends which are of a cross-sectional shape other than circular.

The welding ring 11 is of a cross-sectional shape such as to have projecting external ridge means on its outer periphery and which is here represented as an annularly continuous V-shaped external ridge 30. Although the ridge 30 is here shown as being continuous, it could be an interrupted ridge formed by annularly aligned projecting lugs or ridge segments. The welding ring 11 is also of such cross-sectional shape that along the segment 23, it will be transversely concave on its outer periphery by having groove means 31 therein which extends longitudinally around this segment.

The projecting external ridge 30 extends longitudinally around the segment 24 and onto the parallel sides 25 and 26. This external ridge preferably also extends longitudinally around the segment 23 and substantially bisects the external major groove 31 so as to divide the same into two coextending longitudinal minor grooves 31ª and 31ᵇ.

The cross-sectional shape of the side portions 25 and 26 of the ring 11 is illustrated in Fig. 6. At these points on the ring, the edge portions 29ª and 29ᵇ located on opposite sides of the ridge 30 define longitudinally extending substantially flat lateral surfaces 32 and 33 on the outer periphery of the ring. At these points of the ring, the inner periphery is defined by a convexly rounded surface 34, as shown in Fig. 6. The junctions of the substantially flat longitudinal surfaces 32 and 33 of the outer periphery, with the convexly rounded surface 34 of the inner periphery, define relatively thin sharp longitudinal side edges 35 and 36 on these portion of the ring. At the points of connection of the base of the ridge 30 with the edge portions of the ring, the sides of the ridge form a pair of shoulders extending longitudinally on opposite sides of the ridge and against which portions of the pipe ends 12 and 13 seat when the pipe ends are applied to the ring.

The cross-sectional shape of the ring 11, at the grooved segment 24 thereof, is illustrated in Fig. 8 from which it will be seen that the side edges of the ring have been shaped so as to define projecting outwardly diverging longitudinal edge portions 37 and 38 of a substantially triangular cross-sectional shape and which taper to thin sharp edges 37ª and 38ª at their apices. The triangular longitudinal edge portions 37 and 38 also define the outer longitudinal side walls of the major groove 31 and of the parallel minor grooves 31ª and 31ᵇ. The internal periphery of the segment 23 is defined by a convexly rounded surface 39.

The cross-sectional shape of the ring 11, at its ridged segment 24, is shown in Fig. 7 from which it will be seen that the longitudinal side edges of this portion of the ring are defined by convexly rounded edge portions 40 and 41 on the external periphery of the ring and which represent downwardly and laterally extending continuations of the side faces of the external ridge 30. The internal periphery of the ring 11, at the segment 24 thereof, is defined by a surface 42 which is substantially flat transversely of the ring, as shown in Fig. 7. The junctions of the flat inner surface 42 with the edge portions 40 and 41, define longitudinally extending relatively sharp longitudinal edges 43 and 44.

From the description of the ring 11, as thus far given, it will be seen that the cross-sectional shape changes progressively around the perimeter of the ring, such that one of the opposed segments, in this instance the segment 23, is an externally grooved segment and the opposite segment 24 is an externally ridged segment. The changing characteristic of the cross-sectional shape of the ring also causes the location of the thin sharp side edges of the ring to vary progressively from the position thereof at the grooved segment 23 at which those edges project from the outer periphery substantially in the general plane of the ring, to the position of the edges 35 and 36 of the side portions 25 and 26 which project laterally in opposite directions from the ring substantially at right angles to the general plane thereof. This progressively changing shape of the ring cross-section also causes the edge portions 40 and 41, of the segment 24, to project outwardly and laterally in a direction which is inclined to the general plane of the ring at substantially the same angle as the inclination of the side faces of the external ridge 30.

Because of this progressively changing cross-sectional shape of the ring 11, it will also be seen that the parallel minor grooves 31$^a$ and 31$^b$ of the segment 23, have a maximum depth at a point of this segment which lies substantially on the major axis 11$^a$ and become gradually shallower in depth in opposite directions away from the major axis. As shown in the drawings, this decreasing depth characteristic of these grooves, causes them to fade out completely in the side portions 25 and 26 as the tapered projecting edge portions 37 and 38 merge into the laterally extending edge portions 29$^a$ and 29$^b$. Because of the above-explained progressively changing cross-sectional shape of the ring 11, the grooved segment 23 is somewhat narrower in width than the ridged segment 24.

As mentioned above, the welding ring 11 can be suitably formed from a strip 22 of material having an appropriate cross-sectional shape by forming the strip into the oblong annulus shown in Fig. 2. In the completed ring, the ends of the strip occupy a substantially opposed relation as represented by the ends 22$^a$ and 22$^b$, such that the annulus is substantially continuous perimetrically thereof. In this instance, the opposed ends 22$^a$ and 22$^b$ constitute portions of the segment 24 and define a gap 45 located substantially on the major axis 11$^a$. The ring 11 is somewhat resilient in character, such that the gap 45 can be closed by a compressive force applied inwardly against the opposite side portions 25 and 26.

The use of the welding ring 11 in forming the pipe joint 10 will be described next. It is assumed that the pipe ends 12 and 13 have been ground, or otherwise treated, so as to provide the elliptical flat end faces 12$^a$ and 13$^a$ thereon. The ring 11 is inserted into one of the pipe ends, for example the pipe end 12, after which the pipe end 13 is engaged with the ring to cause the pipe ends and the ring to assume the assembled relation shown in Fig. 1.

In the welding ring and pipe end assembly thus formed and shown in Fig. 1, the grooved segment 23 of the ring performs an important function in that it embraces the acute-angled internal corners 16$^b$ and 17$^b$ of the pipe ends 12 and 13 and holds the pipe ends against separation. In this assembly of the pipe ends and welding ring, the external ridge 30 projects outwardly into the annular weld space 14 and forms a locating spacer between the pipe ends by which they are maintained in an adjacently spaced relation with the flat end faces 12$^a$ and 13$^a$ in a parallel relation and defining the side walls of the weld space. The projecting ridge 30 thus forms the bottom wall of the weld space 14 and when the weld material is introduced into this space, it prevents such material from flowing into the passage of the joint 10.

In forming the welding ring and pipe end assembly of Fig. 1 preparatory to the welding operation, the segment 23 of the ring is inserted by a downward movement into the pipe end 12 thereby causing the acute-angled internal corner 16$^b$ to engage in the minor groove 31$^a$ in the relation shown in Fig. 1. When the internal acute-angled corner 16 has been thus engaged in the minor groove 31$^a$, the other segment 24 of the ring is moved or swung into the opening of the pipe end 12 bringing a side wall of the external ridge 30 into engagement with the internal obtuse-angled corner 16$^a$ of this same pipe end. The welding ring 11 will then be engaged around its full perimeter with the pipe end 12 and when sufficient pressure is applied to the ring tending to wedge the same further into this pipe end, the compressive force of the internal corner 16$^a$ on the sloping side portions 40 and 41 of the segment 24, will deflect the ring sufficiently to close the gap 45, whereupon the ring will, of its own accord, remain engaged in the pipe end 12.

When the pipe end 13 is applied to the ring 11, the acute-angled internal corner 17$^b$ of this pipe end is engaged in the minor groove 31$^b$ of the segment 23. Thereafter, the pipe end 13 is moved or swung to bring the obtuse-angled internal corner 17$^a$ thereof into engagement with the ring whereupon the ring will be engaged around the full periphery thereof by this pipe end. When the pipe end 13 has been thus fully engaged with the ring 11, the two pipe ends will be temporarily connected by the ring and will occupy the positions shown in Fig. 1, and the weld space 14 will be ready to receive the weld material 15. The weld material 15 can be introduced into the space 14 as by an arc welding operation and will become fused with the pipe ends and with the welding ring to join the pipe ends and welding ring securely together.

In the fully assembled relation of the pipe ends 12 and 13 with the welding ring 11, as described above, the thin sharp edges 35, 36 and 37$a$, 38$a$ and 43, 44 formed on the welding ring, will lie closely against or hug the inner surfaces 18 and 19 of the pipe ends. When the welding ring 11 is of the cross-sectional shape described above, these sharp edges will lie against the internal surfaces of the pipe ends for the full perimeter of the ring such that there will be no gaps or crevices remaining between the ring and the internal surface in which sediment, bacteria or other foreign matter could lodge. It will also be seen that the rounded surface portions 34 and 39 and the flat surface 42, of the inner periphery of the welding ring, will conform relatively smoothly with the internal surfaces 18 and 19 of the pipe ends, such that there will be very little disturbance or turbulence produced in the stream of fluid in passing over the welding ring during the flow of such stream through the pipe joint 10.

During the welding opeation, the ring 11 effectively prevents the molten metal from dripping into the passage of the joint being formed such that no icicles or other obstructions will be produced to impede the flow of fluid. Although the weld material 15 will become fused with the ring 11, there will be very little contamination of the weld material by migration of metal from the welding ring.

Fig. 11 has already been referred to above as showing a pipe joint 27 in which a pair of pipe members 47 and 48 are disposed in an angular relation to define therebetween an included angle which is greater than a right angle. The modified pipe joint 27 employs a welding ring 49 which is of the same general type as the welding ring 11, but which is of a size and specific shape to suit the truncated or oblique ends 47$^a$ and 48$^a$ of the pipe members 47 and 48.

Fig. 12 has already been referred to above as showing a pipe joint 28 in which a pair of pipe ends 50 and 51 are disposed in an angular relation to define therebetween an included angle which is smaller than a right angle. The truncated or oblique ends 50$^a$ and 51$^a$ of the pipe members 50 and 51 cooperate with a welding ring 52 in the same manner as has been described above for the pipe ends 12 and 13 with the welding ring 11. The welding ring 52 is of the same type as the welding ring 11 and functions in the same manner, but is of a size and specific shape to suit the pipe ends 50 and 51.

Instead of the welding rings 11, 49 and 52 being made with the external ridge of a substantially triangular or V-shaped cross-section, they can be made with the external ridge of a quadrangular cross-sectional shape. Figs. 13, 14 and 15 are cross-sections taken through a modified welding ring 53 which is similar to the ring 11 but which has an external projecting ridge 54 of this quadrangular cross-sectional shape. When the modified ring 53 is used in forming welded pipe joints of the kind shown in Figs. 1, 11 and 12, the ridge 54 forms a closure or bottom wall for the weld space 14 and also projects into this space and forms a spacer between the pipe ends. In forming this spacer between the pipe ends, the flat side faces 54ª of the ridge 54 are engaged by the flat end faces of the adjacent pipe ends.

It is desirable, but not necessary, that the external ridge 30, or the external ridge 54, extend around the ring segment 23 and longitudinally through the external groove 31 and, accordingly, this portion of the external ridge can be omitted if desired. When the external ridge is omitted from the ring segment 23, the external groove extending around this segment will then consist of a single wide groove 55 as shown in the modified form of welding ring 56 which is illustrated in Fig. 16.

Figs. 17 to 23 inclusive show a welding ring 58 which is of the same general type as the welding ring 11 and is used in the same manner in forming a welded joint between a pair of pipe ends, such as the above-described pipe ends 12 and 13. The welding ring 58 is of somewhat heavier proportions than the ring 11 and is provided on its external periphery with projecting longitudinal ridge means which, in this instance, is formed by a projecting ridge 59 of a substantially quadrangular cross-section and having a longitudinal groove 60 formed in the top thereof. The projecting ridge 59 is defined by sloping longitudinal side walls 61 and 62 extending downwardly and laterally from the edges of the transversely concave top surface 60ª. The side portions 63 and 64 of the ring 58 vary in shape and angular position progressively around the ring as is shown in Figs. 21, 22 and 23 and generally similar to the varying shape and position described above for the side portions of the ring 11.

As shown in Fig. 17, the modified welding ring 58 has rounded segments 65 and 66 at opposite ends of the major axis 67 of which the segment 65 is a ridged segment and the segment 66 is a grooved segment. The side portions 63 and 64 are formed so as to define a major groove 68 in a portion of the external periphery of the ring and extending longitudinally around the segment 66. The ridged segment 65 is interrupted by a gap or transverse slot 69 defined by the adjacent ends of the strip from which the oblong ring 58 is formed. The projecting ridge 59 extends in continuous relation around the perimeter of the ring 58 with a portion thereof extending longitudinally through the major groove 68 and dividing such major groove into two parallel minor grooves 70 and 71.

Figs. 24 and 25 show the modified welding ring 58 being used to form a pipe joint between the above-described pair of pipe ends 12 and 13. In these views, the welding ring 58 is assembled with the pipe ends such that opposite sides of the ridge 59 are engaged by the internal corners 16 and 17 of the pipe ends, with such corners also engaging in the minor grooves 70 and 71. The oblique end faces 12ª and 13ª of the pipe ends cooperate with the ridge 59 of the welding ring 58 to define the annular space 14 for the weld material. When the welding ring 58 is in this assembled position, the gap 69 is closed and the resiliency of the ring causes the same to remain in locked engagement with the pipe ends.

Figs. 26 and 27 show the same pipe joint after the welding operation has been performed thereon. During the welding operation, the weld material 15 introduced into the weld space 14, becomes fused with the pipe ends 12 and 13 and with the ridge 59 of the welding ring 58. An advantage resulting from the grooved form of the ridge 59 is that only a small amount of the metal of the welding ring extends into the weld space and, hence, there will be very little contamination of the weld material 15 by migration of metal from the welding ring thereinto.

Figs. 28 and 29 show welding rings 73 and 74 which are modified forms of the welding ring and are generally similar to the welding ring 58, but in which the grooved ridge is formed by a pair of laterally spaced small V-shaped ridges 75 and 76 and the groove 77 of the ridge means is formed by the space defined between the small parallel ridges 75 and 76. In the welding ring of Fig. 29, the groove 77 of the ridge means is of a greater depth than the height of the ridges 75 and 76. This greater depth for the groove 77 is obtained by extending the bottom of the groove downwardly into the body of the ring.

The modified welding rings of Figs. 28 and 29 possess the advantage that the ridge means thereof extends even less into the weld space 14 of the pipe joint being formed, such that the tendency for contamination of the weld material 15 by migration of metal thereinto from the welding ring, is further minimized.

From the accompanying drawings and foregoing detailed description, it will now be readily understood that this invention provides a novel form of welding ring for use between a pair of pipe ends, or the like, to be welded together, and also provides a novel form of pipe joint employing such welding ring. It will now also be seen that this novel welding ring is of an oblong or elliptical shape and cooperates with the pipe ends to define an annular space for the weld material which is to connect the pipe ends. Likewise, it will be seen that because of the progressively varying cross-sectional shape which provides external groove and ridge elements on the welding ring, this member will have a locked engagement with the pipe ends when assembled therein, and will very effectively accomplish all of the other purposes desired for a welding ring. Additionally, it will be seen that in the completed joint, the tapered side edges of the welding ring hug the internal surfaces of the pipe ends in such a manner that the flow of fluid through the pipe joint will take place with minimum disturbance or turbulence and such that there will be no gaps or crevices in which foreign matter can lodge or accumulate.

Although the novel welding ring and the pipe joint employing the same have been illustrated and described herein to a somewhat detailed extend, it will be understood, of course, that the invention is not to be regarded as being limited correspondingly in scope, but includes all changes and modifications coming within the terms of the claims hereof.

Having thus described my invention, I claim:

1. A welding ring comprising, a metal strip annulus having a substantially elliptical perimetrical shape longitudinally of the strip, the outer longitudinal periphery of the ring having an external ridge projection thereon of substantially narrower width than the strip and lying substantially in the mid-plane of the ring, the segment of the ring at one end of its major axis having side portions on opposite sides of said ridge projection which are divergently inclined relative to said mid-plane and in a direction away from the top of said ridge projection, the segment of the ring at other end of its major axis having side portions on opposite sides of said ridge projection which are divergently inclined in a direction away from the base of said ridge projection and define with said ridge projection a pair of grooves extending longitudinally around the periphery of the last-mentioned segment on opposite sides of said ridge projection, the sides of said ridge projection at the junction of the latter with the strip defining a pair of longitudinal shoulders located on opposite sides of and extending along the base of said ridge projection, said ridge projection extending longitudinally in continuous relation along said outer periphery for the full length thereof and being of a substantially uniform height which is substantially equal to the depth of said grooves.

2. A welding ring as defined in claim 1 in which said ridge projection is substantially V-shaped in cross-section.

3. A welding ring as defined in claim 1 in which said ridge projection is of a generally quadrangular cross-sectional shape.

4. A welding ring as defined in claim 1 in which said ridge projection is of a generally quadrangular cross-sectional shape and whose top is transversely concave.

5. A welding ring as defined in claim 1 in which the inner periphery of the first-mentioned segment of the ring is substantially flat transversely of the strip and the inner periphery of said last-mentioned segment is convexly rounded transversely of the strip.

References Cited in the file of this patent

UNITED STATES PATENTS

| | | |
|---|---|---|
| 24,840 | Bedell | July 19, 1859 |
| 667,045 | Vanstone | Jan. 29, 1901 |
| 958,316 | Rodgers et al. | May 17, 1910 |
| 1,077,741 | Neven | Nov. 4, 1913 |
| 1,499,770 | Greunfeldt | July 1, 1924 |
| 1,630,037 | Stresau | May 24, 1927 |
| 1,980,561 | Wagner | Nov. 13, 1934 |
| 1,984,172 | Brownley | Dec. 11, 1934 |
| 2,125,324 | Williams et al. | Aug. 2, 1938 |
| 2,146,901 | Lane | Feb. 14, 1939 |
| 2,366,579 | Von Ahrens | Jan. 2, 1945 |
| 2,382,098 | Robie | Aug. 14, 1945 |
| 2,395,723 | Chmielewski | Feb. 26, 1946 |
| 2,430,266 | Zimmerman | Nov. 4, 1947 |